United States Patent
Lange

(10) Patent No.: US 10,637,545 B2
(45) Date of Patent: Apr. 28, 2020

(54) SPATIAL SEPARATION SUB-SYSTEM FOR SUPPORTING MULTIPLE-INPUT/MULTIPLE-OUTPUT OPERATIONS IN DISTRIBUTED ANTENNA SYSTEMS

(71) Applicant: CommScope Technologies LLC, Hickory, NC (US)

(72) Inventor: Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/051,006

(22) Filed: Jul. 31, 2018

(65) Prior Publication Data

US 2018/0337715 A1 Nov. 22, 2018

Related U.S. Application Data

(63) Continuation of application No. 15/118,581, filed as application No. PCT/US2015/013886 on Jan. 30, 2015, now Pat. No. 10,063,294.

(Continued)

(51) Int. Cl.
*H04W 88/08* (2009.01)
*H04B 7/0456* (2017.01)
(Continued)

(52) U.S. Cl.
CPC .......... *H04B 7/0456* (2013.01); *H04B 7/022* (2013.01); *H04B 7/024* (2013.01); *H04B 7/0417* (2013.01);
(Continued)

(58) Field of Classification Search
CPC ...... H04B 7/0456; H04B 7/024; H04B 7/022; H04B 7/0639; H04B 7/0452; H04B 7/0417; H04W 88/085
See application file for complete search history.

(56) References Cited

U.S. PATENT DOCUMENTS 6,208,294 B1 * 3/2001 Kobayakawa ....... H01Q 3/2605
342/368
8,175,649 B2 * 5/2012 Saban .................... H01Q 3/005
455/562.1

(Continued)

FOREIGN PATENT DOCUMENTS

EP 2315309 A1 4/2011
WO 2012075137 A1 6/2012
WO 2016073885 A1 5/2016

OTHER PUBLICATIONS

European Patent Office, "Communication under Rule 71(3) from EP Application No. 15749336.2 dated Feb. 15, 2019", from Foreign Counterpart to U.S. Appl. No. 15/118,581, Feb. 15, 2019, pp. 1-47, Published: EP.

(Continued)

*Primary Examiner* — Jay P Patel
(74) *Attorney, Agent, or Firm* — Fogg & Powers LLC

(57) ABSTRACT

A system is described. The system includes remote antenna units of a distributed antenna system. The system also includes a combiner unit of the distributed antenna system. The combiner unit is communicatively connectable to a base station and communicatively connectable to the remote antenna units. The combiner unit is configured to receive at least two uplink signals from the remote antenna units. The remote antenna units receive the at least two uplink signals from one or more wireless terminal devices. The combiner unit is also configured to combine the at least two uplink signals into at least one combined uplink signal and send the at least one combined uplink signal to the base station.

16 Claims, 6 Drawing Sheets

Related U.S. Application Data

(60) Provisional application No. 61/939,438, filed on Feb. 13, 2014.

(51) Int. Cl.
*H04B 7/0417* (2017.01)
*H04B 7/022* (2017.01)
*H04B 7/0452* (2017.01)
*H04B 7/024* (2017.01)
*H04B 7/06* (2006.01)

(52) U.S. Cl.
CPC ........ *H04B 7/0452* (2013.01); *H04W 88/085* (2013.01); *H04B 7/0639* (2013.01)

(56) References Cited

U.S. PATENT DOCUMENTS

| | | | |
|---|---|---|---|
| 8,340,573 | B2 | 12/2012 | Fenech et al. |
| 9,338,823 | B2* | 5/2016 | Saban ................ H04W 88/085 |
| 10,063,294 | B2 | 8/2018 | Lange |
| 2003/0228854 | A1 | 12/2003 | Morris et al. |
| 2007/0285312 | A1* | 12/2007 | Gao ...................... H01Q 1/246 |
| | | | 342/367 |
| 2008/0150514 | A1 | 6/2008 | Codreanu et al. |
| 2010/0099451 | A1* | 4/2010 | Saban .................... H01Q 3/005 |
| | | | 455/502 |
| 2010/0136902 | A1 | 6/2010 | Barak et al. |
| 2010/0278530 | A1 | 11/2010 | Kummetz et al. |
| 2011/0135308 | A1 | 6/2011 | Tarlazzi et al. |
| 2011/0201368 | A1 | 8/2011 | Faccin et al. |
| 2012/0027145 | A1* | 2/2012 | Uyehara ............... H04J 3/0685 |
| | | | 375/356 |
| 2012/0140780 | A1* | 6/2012 | Chang ................. H04B 7/0413 |
| | | | 370/479 |
| 2012/0177011 | A1 | 7/2012 | Xi et al. |
| 2012/0177026 | A1* | 7/2012 | Uyehara ................. H04B 1/18 |
| | | | 370/345 |
| 2012/0257575 | A1 | 10/2012 | Davydov et al. |
| 2013/0044650 | A1 | 2/2013 | Barker et al. |
| 2013/0076565 | A1 | 3/2013 | Lee et al. |
| 2013/0107763 | A1* | 5/2013 | Uyehara ................ H04B 7/024 |
| | | | 370/278 |
| 2013/0188753 | A1 | 7/2013 | Tarlazzi et al. |
| 2013/0195467 | A1* | 8/2013 | Schmid ................ H04B 1/0096 |
| | | | 398/115 |
| 2013/0308693 | A1 | 11/2013 | Li et al. |
| 2014/0192918 | A1 | 7/2014 | Park et al. |
| 2015/0016441 | A1 | 1/2015 | Hanson et al. |
| 2015/0373722 | A1* | 12/2015 | Lange .................... H04B 7/026 |
| | | | 370/315 |
| 2016/0013855 | A1* | 1/2016 | Campos .................. H04B 7/12 |
| | | | 370/343 |

OTHER PUBLICATIONS

European Patent Office, "Extended European Search Report from EP Application No. 15749336.2 dated Sep. 1, 2017", from Foreign Counterpart to PCT Application No. PCT/US2015/013886, Sep. 1, 2017, pp. 1-15, Published: EP.

International Bureau, "Notification Concerning Transmittal of International Preliminary Report on Patentability from PCT Application No. PCT/US2015/013886 dated Aug. 25, 2016", from Foreign Counterpart to U.S. Appl. No. 15/118,581, Aug. 25, 2016, pp. 1-11, Published: Switzerland.

International Searching Authority, "International Search Report and Written Opinion from PCT Application No. PCT/US2015/013886 dated Apr. 27, 2015", from Foreign Counterpart to U.S. Appl. No. 15/118,581, Apr. 27, 2015, pp. 1-13, Published: KR.

U.S. Patent and Trademark Office, "Notice of Allowance", U.S. Appl. No. 15/118,581, dated May 2, 2018, pp. 1-9, Published: US.

U.S. Patent and Trademark Office, "Office Action", U.S. Appl. No. 15/118,581, dated Jan. 11, 2018, pp. 1-18, Published: US.

\* cited by examiner

SPATIAL SEPARATION SUB-SYSTEM FOR SUPPORTING MULTIPLE-INPUT/MULTIPLE-OUTPUT OPERATIONS IN DISTRIBUTED ANTENNA SYSTEMS

CROSS-REFERENCE TO RELATED APPLICATIONS

This application is a continuation of U.S. patent application Ser. No. 15/118,581, filed Aug. 12, 2016 and titled "SPATIAL SEPARATION SUB-SYSTEM FOR SUPPORTING MULTIPLE-INPUT/MULTIPLE-OUTPUT OPERATIONS IN DISTRIBUTED ANTENNA SYSTEMS," which is a U.S. National Stage application of PCT Application Serial No. PCT/US2015/013886, filed Jan. 30, 2015 and titled "SPATIAL SEPARATION SUB-SYSTEM FOR SUPPORTING MULTIPLE-INPUT/MULTIPLE-OUTPUT OPERATIONS IN DISTRIBUTED ANTENNA SYSTEMS," which claims the benefit of U.S. Provisional Application Ser. No. 61/939,438, filed Feb. 13, 2014 and titled "A DISTRIBUTED ANTENNA SYSTEM SUPPORTING DOWNLINK SINGLE USER MULTIPLE INPUT MULTIPLE OUTPUT (SU-MIMO) AND MULTIPLE USER MULTIPLE INPUT MULTIPLE OUTPUT (MU-MIMO)," the contents of all of which are hereby incorporated by reference.

TECHNICAL FIELD

The present disclosure relates generally to telecommunications systems and more particularly (although not necessarily exclusively) to a spatial separation sub-system for supporting multiple-input/multiple-output operations in distributed antenna systems.

BACKGROUND

Single input single output ("SISO") systems can use one downlink antenna for transmitting downlink signals and one receive antenna receiving uplink signals. A disadvantage of SISO systems is that these systems can have limited performance due to interference and fading. SISO throughput can also be slower because throughput is dependent upon limited channel bandwidth and the signal-to-noise ratio.

Multiple-input/multiple-output ("MIMO") systems can use multiple antennas to transmit data to a terminal device (e.g., a mobile communication device) and can use multiple antennas to receive data from a terminal device. In MIMO systems, the availability of two or more antennas allows for additional techniques to be used to further improve the performance or reliability of a system. Additionally or alternatively, a telecommunications system can use single input multiple output ("SIMO") technology or multiple input single output ("MISO") technology, depending on the number of antennas at each of the transmitter and receiver.

SUMMARY

According to one aspect, a spatial separation sub-system is provided for supporting single-stream transmission operations (e.g., single-input/single-output ("SISO"), transmit diversity, cyclic delay diversity, etc.) and multiple-input/multiple-output ("MIMO") operations in a distributed antenna system ("DAS"). The spatial separation sub-system can include input ports that are communicatively connectable to a base station, output ports that are communicatively connectable to remote antenna units of the DAS, and RF circuitry that communicatively connects the input ports and the output ports. The spatial separation sub-system can receive at least two downlink signals via at least two of the input ports. A phase difference between the downlink signals can correspond to a codebook index used to encode the downlink signals (e.g., for single-stream transmission or different types of MIMO transmission). The RF circuitry can provide a combined signal power from the downlink signals to one or more of the output ports based on the phase difference between the downlink signals.

According to another aspect, a DAS is provided that can support single-stream and MIMO operations. The system can include remote antenna units of a DAS and one or more splitter units of the DAS. The splitter unit can include input ports that can communicatively connect the splitter unit with a base station. The splitter unit can also include output ports that can communicatively connect the splitter unit with the remote antenna units. The splitter unit can receive at least two downlink signals via at least two of the input ports. A phase difference between the downlink signals can correspond to a codebook index used to encode the downlink signals. The splitter unit can provide a combined signal power from the received downlink signals to one or more of the output ports based on the phase difference between the downlink signals.

According to another aspect, a method is provided. The method can involve receiving, via at least two input ports of a splitter unit, at least two downlink signals from a base station. The downlink signals can be encoded using a codebook index for MIMO transmission. A phase difference between the downlink signals can correspond to the codebook index. The method can also involve the splitter unit combining the downlink signals based on the phase difference such that a combined signal power from the at least two downlink signals is greater at one or more output ports of the splitter unit than at one or more other output ports of the splitter unit. The method can also involve outputting, via the output port, the combined signal power to at least one remote antenna unit servicing a coverage zone of a distributed antenna system.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
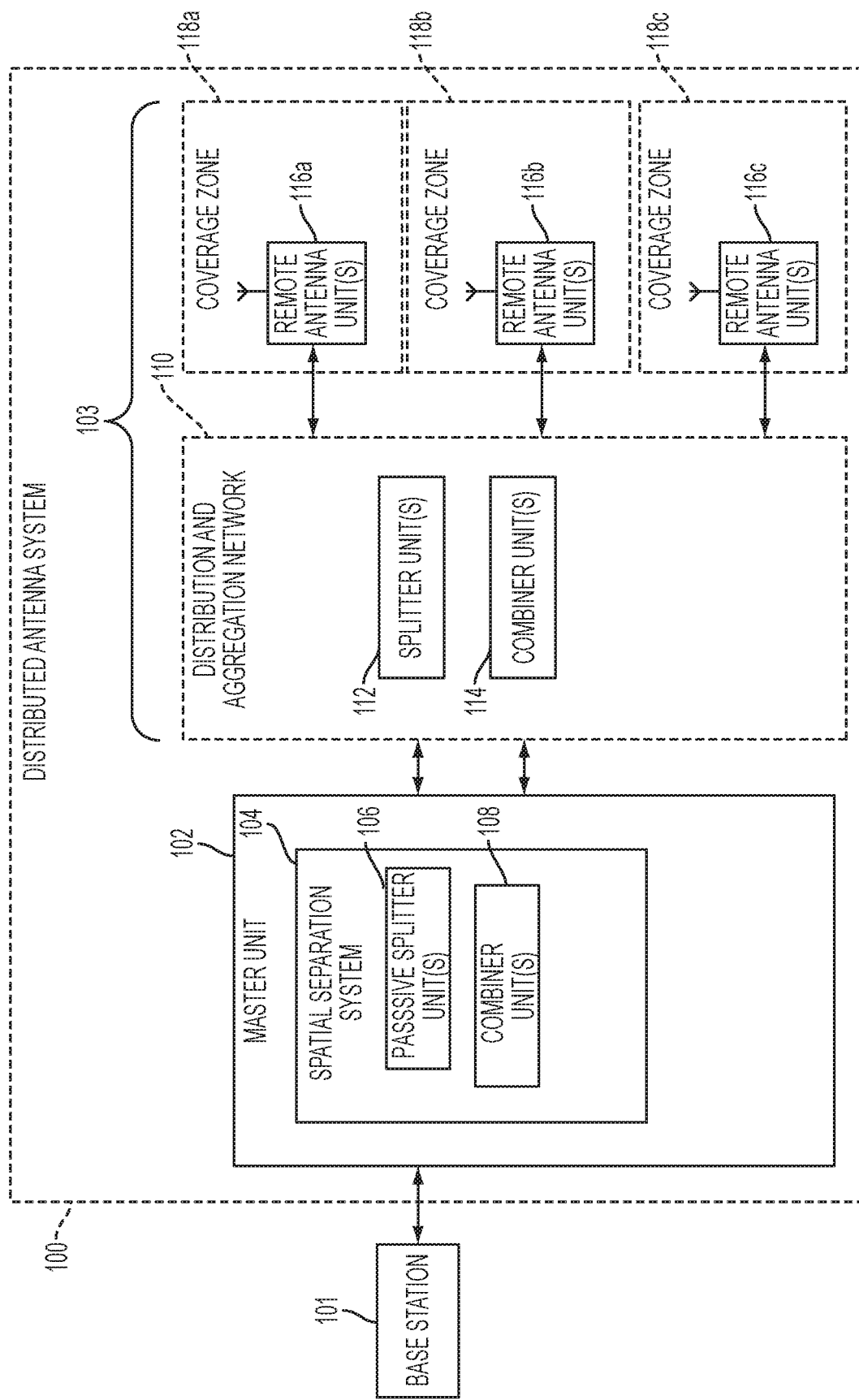
FIG. 1 is a block diagram depicting an example of a distributed antenna system ("DAS") that can include a spatial separation sub-system according to one aspect of the present disclosure.

Certain aspects and features relate to a spatial separation sub-system for a distributed antenna system ("DAS"). The spatial separation sub-system can allow the DAS to support single-stream transmission and multiple-input/multiple-output ("MIMO") operations. Examples of single-stream transmission operations include single-input/single-output ("SISO"), transmit diversity, cyclic delay diversity, etc. Example of MIMO operations include single-user MIMO ("SU-MIMO") and multi-user MIMO ("MU-MIMO"). An example of a spatial separation sub-system is a splitter unit with RF circuitry that communicatively connects input ports and output ports of the splitter unit. In some aspects, the splitter unit can be implemented digitally. In other aspects, the splitter unit can be implemented using passive RF circuitry. The spatial separation sub-system can communicate with a base station via the input ports and communicate with remote antenna units of the DAS via the output ports. Downlink signals received via at least two of the input ports can have a phase difference that corresponds to a codebook index used to encode the downlink signals (e.g., for SISO or other single-stream transmission or for MIMO transmission). The downlink signals can include signal components associated with resource blocks used by terminal devices in communication with the DAS. The RF circuitry can provide combined signal power from the downlink signals to different output ports based on various differences in phase between the downlink signals.

Providing different sets of combined signal power to different output ports can allow multiple data streams to be routed to multiple remote antenna units in the DAS. In one example, the splitter unit may receive two downlink signals having a first phase difference corresponding to a first codebook index. The first phase difference can cause the RF circuitry to combine the downlink signals such that a combined signal power associated with the downlink signals is maximized at a first one of the output ports of the spatial separation sub-system (e.g., an output port communicatively coupled to a remote antenna unit servicing a first coverage zone). In another example, the splitter unit may receive two additional downlink signals having a second phase difference corresponding to a second codebook index. The second phase difference can cause the RF circuitry to combine the downlink signals such that the combined signal is maximized at a second one of the output ports of the spatial separation sub-system (e.g., an output port communicatively coupled to a remote antenna unit servicing a second coverage zone).

The spatial separation sub-system can provide spatial separation of downlink signals to support SU-MIMO and MU-MIMO in DAS. A DAS that is configured for SU-MIMO can simultaneously transmit multiple data streams using the same frequency to a single terminal device (e.g., a mobile communication device or other user equipment) using multiple antennas. A data stream can be a set of data (e.g., voice data or other data). The terminal device can combine the multiple data streams into a combined data set. A DAS that is configured for MU-MIMO operation can use spatially separated antennas to communicate different data streams to spatially separated terminal devices using the same frequency or set of frequencies. For example, MU-MIMO operation can reuse the same frequency resource for multiple terminals devices. One or more terminal devices located in a first geographical area serviced by the DAS can be served using the same frequency resources as one or more additional terminal devices located in a second geographical area serviced by the DAS. A given terminal device in the first area may use the same frequency as several terminal devices in the second area.

In some aspects, the spatial separation sub-system can be included in a unit of the DAS. The unit of the DAS can communicate baseband signals with one or more devices providing base station functionality. Non-limiting examples of this unit may include a master unit, a base station router, etc. The spatial separation sub-system can include one or more splitter units or another device having RF circuitry. Passive RF circuitry can include circuitry for performing one or more of splitting and combining signals received at input ports and outputting the modified signals at the output port. The RF circuitry can split and combine signals without utilizing a digital signal processor or other processing devices.

The DAS may also include a radio distribution system having two or more remote antenna units. Each remote antenna unit can include at least one receive antenna for providing at least one uplink signal. Each remote antenna unit can also include at least two downlink antennas for transmitting the downlink MIMO signals. For example, a base station may have one or more uplink antenna ports for receiving uplink signals from a DAS unit and one or more downlink antenna ports for providing downlink signals to the DAS unit. The DAS unit can be communicatively coupled to the uplink antenna ports and downlink antenna ports of the base station. The DAS unit that includes a spatial separation sub-system can receive downlink signals from a base station or other signal source via the communicative coupling to the downlink antenna ports of the base station. The spatial separation sub-system can split or otherwise separate downlink signals received from a base station into multiple downlink MIMO signals. The splitter unit can provide each of the downlink MIMO signals to a different remote antenna unit from a set of remote antenna units.

In some aspects, the spatial separation sub-system can also include one or more combiners. A combiner in the spatial separation sub-system can combine uplink signals received from the radio distribution system into one or more combined uplink signals. For example, a unit of the DAS may receive a number of uplink signals that is greater than a number of antenna ports at a base station in communication with the DAS. The combiner can provide the combined uplink signals to the base station.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting an example of a DAS 100 that can include a spatial separation sub-system allowing the DAS 100 to support SISO or other single-stream transmission and MIMO operations.

The DAS 100 can include one or more master units 102 and a radio distribution system 103. The master unit 102 can be communicatively coupled to a base station 101 or other suitable device that provides wireless service within a geographic area or structure. A non-limiting example of a base station 101 is an eNodeB of a Long-Term Evolution ("LTE") telecommunications system. Any suitable communication link can be used for communication between the base station 101 and the master unit 102. In some aspects, the communication link can be a wired connection. Non-limiting examples of a wired connection include a copper cable, an optical fiber, or other suitable wired communication medium. In additional or alternative aspects, the communication link can be a wireless connection.

The radio distribution system 103 can include a distribution and aggregation network ("DAN") 110 and remote antenna units 116a, 116b, 116c or other suitable antenna nodes that provide telecommunications services in coverage zones 118a, 118b, 118c. The DAN 110 can include communication links that communicatively couple the master unit 102 to the remote antenna units 116a, 116b, 116c (e.g., optical fiber, coaxial cable, etc.). For example, the remote antenna units 116a, 116b, 116c or other suitable antenna nodes can be communicatively coupled to the master unit 102 via one or more transport media. In some aspects, the DAN 110 can also include devices such as extension units that may include one or more splitter units 112 and one or more combiner units 114.

The DAS 100 can communicate signals between one or more base stations 101 and terminal devices (e.g., mobile communication devices or other terminal device). For example, the master unit 102 can receive downlink signals from a base station 101 and transmit uplink signals to the base station 101. The master unit 102 can provide downlink signals to the remote antenna units 116a, 116b, 116c via the DAN 110. In some aspects, one or more splitter units 112 in the DAN 110 can be used to split or otherwise separate downlink signals for transmission to multiple remote antenna units. For example, an expansion unit in the DAN 110 can include a splitter unit 112 for splitting downlink signals that are to be provided to multiple remote antenna units 116a in a coverage zone 118a. The master units 102 can receive uplink signals from the remote antenna units 116a, 116b, 116b. In some aspects, one or more combiner units 114 in the DAN 110 can be used to combine uplink signals for transmission to the master unit 102. For example, an expansion unit in the DAN 110 can include a combiner unit 114 for combining multiple uplink signals received by multiple remote antenna units 116b from the same terminal device located in a coverage zone 118b that are to be provided to multiple remote antenna units 116a in a coverage zone 118a. The expansion unit can transmit the combined uplink signal to the master unit 102.

The remote antenna units 116a, 116b, 116c can be spatially separated or otherwise isolated with respect to one another. This spatial separation or other isolation can facilitate MIMO operations. Any number of two or more antennas can be used by a transmitting or receiving device in a DAS that is configured for MIMO operation. Examples of MIMO configurations include configurations in which two, four, or eight antennas are included in one or both of a transmitting device (e.g., a remote antenna unit) and a receiving device (e.g., a mobile communication device or other terminal device). For a SU-MIMO configuration, a given terminal device can include multiple antennas for communicating with a multi-antenna transmitter (e.g., a remote antenna unit having multiple antennas, a group of remote antenna units, etc.). For a MU-MIMO configuration, multiple antennas can be distributed across multiple terminal devices. The terminal devices can communicate with a multi-antenna transmitting device.

MIMO configurations can allow the DAS 100 to provide higher data transfer rates with increased spectral efficiency. The performance of a MIMO system can be affected by the received signal-to-interference-and-noise ratio ("SINR"). The performance of a MIMO system can also be affected by the correlation properties that are characteristic of the multipath channel and antenna configuration.

A MIMO system can be configured to compensate for a low SINR or other adverse channel conditions by, for example, using precoding. Precoding can include assigning respective weights to multiple data streams that are to be transmitted by different antenna ports of the base station 101. The weights can be selected such that the amount of data transmitted from the base station 101 to a given terminal device over a given communication channel is maximized or otherwise optimized. For example, the use of precoding can increase or equalize the received SINR across multiple receive antennas at a terminal device. In aspects involving MU-MIMO communication, different data streams for different terminal devices may be transmitted via the same antenna ports of the base station 101 using different precoding codebook indices, as described herein.

For a base station 101 in communication with a DAS 100, precoding can be performed based on the conditions of communication channels between one or more remote antenna units and one or more terminal devices. Precoding operations can optimize or otherwise improve the transmission of downlink signals to terminal devices and the receipt of uplink signals from terminal devices. For example, in a 2×2 MIMO system having two transmit antennas and two receive antennas, four separate communication channels may be present between various transmit antennas and receive antennas. Each communication channel can include a combination of multiple transmission paths between a transmitting device and a receiving device. Examples of these transmission paths include one or more of a direct line-of-sight path and numerous multi-paths created by reflection, scattering, and diffraction of transmitted signal by the environment in which the transmitting and receiving devices are located. For a channel condition in which the SINR is too low at one or more receive antennas, a MIMO receiving device may not be able to properly recover data streams transmitted by a MIMO transmitting device. Performing one or precoding operations can equalize the signal reception across the receive antennas.

In some aspects, a MIMO system can use codebook indices to determine how downlink signals are precoded for transmission to terminal device. For example, the Long Term Evolution ("LTE") specification defines a set of precoding matrices for combining data streams or layers before transmission by a MIMO transmitting device. The precoding matrices can be defined for different MIMO configurations. A precoding matrix can be selected from a random codebook. Selecting a codebook index corresponding to a precoding matrix can allow a portion of each data stream or signal layer to be transmitted through each antenna in a MIMO transmitting device. Depending on channel conditions between the MIMO transmitting device and the MIMO receiving device, codebook selection may also improve and equalize the SINR at each receiving device.

A codebook index or other identifier of a precoding matrix can be used for combining digital streams of data before transmission by a MIMO antenna configuration. Examples of codebook indices include the transmission modes specified by the 3GPP specification TS 36.211 (e.g., transmission mode 4 with DCI format 2 wording). In one example, for a base station having 101 having two antenna ports, four codebook indices of the 3GPP LTE transmission mode 4 with DCI format 2 can be available for use with the DAS 100. In another example, for a base station having four or eight antenna ports, sixteen codebook indices of the 3GPP LTE transmission mode 4 with DCI format 2 may be available for use with the DAS 100

The master unit 102 can include a spatial separation sub-system 104 that is used to facilitate MIMO operations in the DAS 100. The spatial separation sub-system 104 can be used to implement one or more beamforming techniques (e.g., feedback data, precoding, LTE codebook selection, etc.) in the DAS 100. The beamforming techniques can improve the performance and reliability of the DAS 100 by more efficiently using wireless network resources.

The spatial separation sub-system 104 can include one or more splitter units 106. The splitter unit 106 can split or otherwise separate downlink signals received from the base station 101 and combine the split signals for output at different output ports. The splitting and combining features of the splitter unit 106 can allow one or more of SU-MIMO services and MU-MIMO services to be provided for terminal devices in one or more of the coverage zones 118a, 118b, 118c. The spatial separation sub-system 104 can also include one or more combiner units 108. In some aspects, one or more combiner units 108 of the spatial separation sub-system 104 can combine one or both of SU-MIMO uplink signals and MU-MIMO uplink signals received the remote antenna units 116a, 116b, 116c for transmission to the base station 101. In some aspects, the splitter unit 106 can be implemented digitally. In other aspects, the splitter unit 106 can be implemented using passive RF circuitry.

Figure 2:
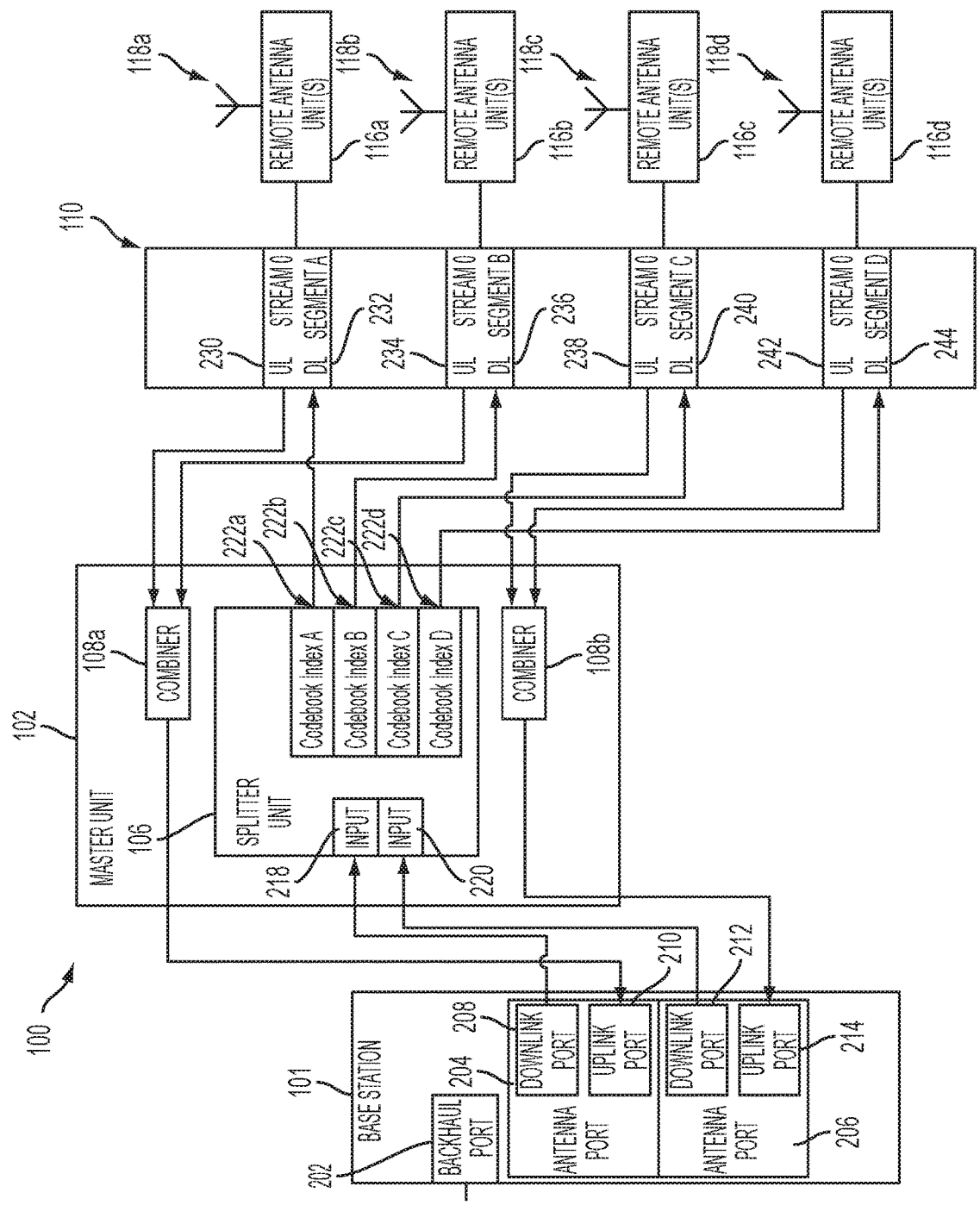
FIG. 2 is a block diagram depicting an example of a DAS that can be used by a two-port base station for single-stream transmission and multiple-input/multiple-output ("MIMO") operation according to one aspect of the present disclosure.

FIG. 2 is a block diagram depicting an example of a DAS 100 that can be used by a two-port base station 101 for SISO or other single-stream transmission operation and MIMO operation.

The base station 101 depicted in FIG. 2 includes a backhaul port 202 and antenna ports 204, 206. The antenna port 204 can include an uplink port 210 (or uplink port functionality) and a downlink port 208 (or downlink port functionality). The antenna port 206 can include an uplink port 214 (or uplink port functionality) and a downlink port 212 (or downlink port functionality). For illustrative purposes, FIG. 2 depicts the uplink ports 210, 214 as separate elements from the downlink ports 208, 212. However, other implementations are possible. In one example, one or more of the antenna ports 204, 206 can be configured to switch between an uplink mode for receiving uplink signals and a downlink mode for receiving downlink signals and thereby provide time division duplexing. In another example, one or more of the antenna ports 204, 206 can be coupled to a diplexer to provide frequency division duplexing.

The master unit 102 depicted in FIG. 2 includes the splitter unit 106 and the combiner units 108a, 108b. The splitter unit 106 can include input ports 218, 220 and output ports 222, 224, 226, 228. For illustrative purposes, FIG. 2 depicts the splitter unit 106 as having two input ports and four output ports. However, other implementations are possible. For example, the splitter unit 106 can include any number of input ports and any number of output ports that is greater than the number of input ports.

The remote antenna units of the DAS 100 can be organized into segments that service different coverage zones. One or more remote antenna units 116a for a segment A of the DAS 100 can be positioned in the coverage zone 118a. One or more remote antenna units 116b for a segment B of the DAS 100 can be positioned in the coverage zone 118b. One or more remote antenna units 116c for a segment C of the DAS 100 can be positioned in the coverage zone 118c. One or more remote antenna units 116d for a segment D of the DAS 100 can be positioned in the coverage zone 118d.

In the downlink direction, the DAN 110 depicted in FIG. 2 can be used to transmit downlink data streams A, B, C, and D from the base station 101 via the master unit 102 to the respective coverage zones 118a, 118b, 118c, 118d. In the uplink direction, the DAN 110 can be used to transmit uplink data streams 0 from the respective coverage zones 118a, 118b, 118c, 118d to the base station 101 via the master unit 102.

The DAS 100 depicted in FIG. 2 can support SU-MIMO and MU-MIMO. The splitter unit 106 can allow the base station 101 to intelligently switch between different modes of operation. The different modes of operation include SISO or other single-stream transmission, MIMO, and MU-MIMO. The different modes of operation can maximize or otherwise optimize communication of data from the base station 101 to terminal devices in one or more of the coverage zones 118a, 118b, 118b. Different terminal devices equipment in one or more of the coverage zones 118a, 118b, 118b can have different capabilities or antenna configurations. For example, SU-MIMO can be used for a terminal device that is located between segments A and B and MU-MIMO can used for two different terminal devices located in different segments. Downlink signals can be separated by the splitter unit 106 for transmission into two different coverage zones (e.g., coverage zones 118a, 118c).

The splitter unit 106 can be communicatively connected to the base station 101 via the input ports 218, 220. In some aspects, communicatively connecting the splitter unit 106 to the base station 101 can involve using a wired connection to communicate signals between the splitter unit 106 and the base station 101. In additional or alternative aspects, communicatively connecting the splitter unit 106 to the base station 101 can involve using a wireless connection to communicate signals between the splitter unit 106 and the base station 101. In some aspects, a communicative connection between the splitter unit 106 and the base station 101 can be a direct connection, as depicted in FIG. 2. In additional or alternative aspects, a communicative connection between the splitter unit 106 and the base station 101 can involve connections to one or more intermediate devices (e.g., a point-of-interface device for a DAS 100) located between the splitter unit 106 and the base station 101 in a signal path.

The splitter unit 106 can receive downlink signals from the base station via the input ports 218, 220. The received downlink signals can have a phase difference that corresponds to a codebook index used by the base station 101 to encode the downlink signals. In some aspects, the base station 101 can encode the downlink signals for transmit diversity. In other aspects, the base station 101 can encode the downlink signals for SU-MIMO operation. In other aspects, the base station 101 can encode the downlink signals for MU-MIMO operation.

The splitter unit 106 can be communicatively connected to the DAN 110 via the output ports 222, 224, 226, 228. In some aspects, communicatively connecting the splitter unit 106 to the DAN 110 can involve using a wired connection to communicate signals between the splitter unit 106 and the DAN 110. In additional or alternative aspects, communicatively connecting the splitter unit 106 to the DAN 110 can involve using a wireless connection to communicate signals between the splitter unit 106 and the DAN 110. In some aspects, a communicative connection between the splitter unit 106 and the DAN 110 can be a direct connection, as depicted in FIG. 2. In additional or alternative aspects, a communicative connection between the splitter unit 106 and the DAN 110 can involve connections to one or more intermediate devices located between the splitter unit 106 and the DAN 110 in one or more signal paths.

The splitter unit 106 can provide a combined signal power from the received downlink signals to one of the output ports 222, 224, 226, 228 based on a phase difference between the downlink signals received via the input ports 218, 220. For example, the splitter unit 106 can include RF circuitry. A non-limiting example of such RF circuitry is a Butler matrix. The RF circuitry can remove the phase difference between the received downlink signals to generate phase-aligned downlink signals. The RF circuitry can combine the phase-aligned downlink signals. The phase difference and subsequent phase alignment can influence the combining operation of the splitter unit 106 such that various differences in phase can control output signal power at the output ports 222, 224, 226, 228. For example, in some aspects, the splitter unit 106 can combine downlink signals based on their phase difference such that the combined signal power provided to the one of the output ports 222, 224, 226, 228 is greater than signal power associated with one or more of the downlink signals at each of the other output ports 222, 224, 226, 228. In other aspects involving transmit diversity, the splitter unit 106 can provide equal power to the output ports 222, 224, 226, 228.

The selection of codebook indices can be performed by the base station 101 based on feedback data received from terminal devices. For example, a terminal device may be located in a coverage zone service 118a serviced by segment A. The terminal device may transmit feedback data to the base station 101 requesting the use of codebook index 0. The base station 101 can transmit a downlink signal to the master unit 102 using codebook index 0. The splitter unit 106 can route the downlink signal for the terminal device to the output port 222 associated with codebook index 0.

The splitter unit 106 can be used to receive a pair of encoded downlink signals from downlink ports 208, 212 of the base station 101. Spatial information for the downlink signals transmitted via the splitter unit 106 can be encoded using a phase difference between the downlink signals. The phase difference can correspond to a codebook index used to encode the downlink signals. For example, a phase difference of 90 degrees between the two signals can correspond to the downlink signals being encoded by the base station 101 using codebook index A, a phase difference of 180 degrees between the two signals can correspond to the downlink signals being encoded by the base station 101 using codebook index B, a phase difference of −90 degrees between the two signals can correspond to the downlink signals being encoded by the base station 101 using codebook index C, and a phase difference of −180 degrees between the two signals can correspond to the downlink signals being encoded by the base station 101 using codebook index D. The splitter unit 106 can receive the first downlink signal via the input port 218 and receive the second downlink signal via the input port 220. The splitter unit 106 can be configured to phase-align the two signals, add or otherwise combine the two signals, and provide the two signals to one of the output ports 222, 224, 226, 228 of the splitter unit 106.

The phase difference between the signals can determine which of the output ports 222, 224, 226, 228 will output the combined signal with the strongest signal power. For example, the splitter unit 106 can be configured to provide the combined signal power from two downlink signals having a phase difference corresponding to codebook index A (e.g., 90 degrees) to the output port 222. The splitter unit 106 can be configured to provide the combined signal power from two downlink signals having a phase difference corresponding to codebook index B (e.g., 180 degrees) to the output port 224. The splitter unit 106 can be configured to provide the combined signal power from two downlink signals having a phase difference corresponding to codebook index C (e.g., −90 degrees) to the output port 226. The splitter unit 106 can be configured to provide the combined signal power from two downlink signals having a phase difference corresponding to codebook index D (e.g., −180 degrees) to the output port 228.

In a first example involving SISO or other single-stream transmission operation, the base station 101 can transmit two downlink signals having the same information (i.e., identical data streams targeted to the same terminal device) on the downlink ports 208, 212. The two downlink signals having the same information can have a phase difference (e.g., a phase of 45 degrees for the first downlink signal and a phase of −45 degrees for the second downlink signal) corresponding to a codebook index used to encode the two downlink signals. The phase difference of 90 degrees between the two downlink signals can cause the splitter unit 106 to provide the combined signal power of the two downlink signals to the output port 222 corresponding to codebook index A. The phase difference of 90 degrees between the two downlink signals can cause the splitter unit 106 to provide little to no signal power from the two downlink signals to the output ports 224, 226, 228 corresponding to codebook indices B, C, and D.

In a second example involving MU-MIMO operation, the base station 101 can transmit two downlink signals having different information (i.e., different streams targeted to different terminal devices) on the downlink ports 208, 212. The two downlink signals respectively including two data streams can have a phase difference of 180 degrees that corresponds to codebook indices used to encode the two downlink signals. For example, the first downlink signal including a first data stream can be targeted to a first terminal device. The first downlink signal can be encoded using codebook index A and have a phase of 90 degrees. The second downlink signal including a second data stream that is targeted to a second terminal device. The second downlink signal can be encoded using codebook index B and have a phase of −90 degrees. The phase difference of 180 degrees between the two downlink signals can cause the splitter unit 106 to provide positive signal power from the combined downlink signals to the output port 222 corresponding to codebook index A. The positive signal power from the combined downlink signals can correspond to the data stream encoded on the first downlink signal by the base station 101 using codebook index A. The phase difference of 180 degrees between the two downlink signals can also cause the splitter unit 106 to provide negative signal power from the combined downlink signals to the output port 224 corresponding to codebook index B. The negative signal power from the combined downlink signals can correspond to the data stream encoded on the first downlink signal by the base station 101 using codebook index B. The signal power corresponding to the first data stream can be routed to one or more remote antenna units 116a and the signal power corresponding to the second data stream can be routed to one or more remote antenna units 116b. The spatially separated remote antenna units 116a, 116b can use the same frequency resources to transmit the different data streams to different terminal devices in different coverage zones 118a, 118b.

In a MU-MIMO configuration, the DAS 100 can be used to transmit multiple downlink signals using the same frequency resource in parallel transmission to multiple terminal devices that receive signals from different segments of the DAS 100 that are spatially separated or otherwise isolated from one another. For example, segments A and B may service a first floor of an office building and segments C and D may service a second floor of the office building. The first and second floors can be separated by a distance or by suitable structures such that signals transmitted on the first floor are isolated from signals transmitted on the second floor. Downlink signals transmitted to a first terminal device located on the first floor may be combined with downlink signals transmitted to a second terminal device located on the second floor. For example, a downlink signal for a terminal device in segment A may be combined with a downlink signal for a terminal device in segment C.

In another example involving SU-MIMO operation, the base station 101 can use the DAS 100 to transmit two uncorrelated signals (i.e., two separate data streams) to the same terminal device. SU-MIMO operation can be used for a terminal device that can receive downlink signals from one or more remote antenna units 116a and one or more remote antenna units 116b (e.g., a terminal device that is located at or near a boundary between coverage zones 118a, 118b). A first signal corresponding to a first MIMO stream encoded using a codebook index A can be transmitted via the downlink port 208 and a second signal corresponding to a second MIMO stream encoded using a codebook index C can be transmitted via the downlink port 212. The first data stream encoded on a first downlink signal using codebook index A can be routed to the output port 222a, as described above with respect to the MU-MIMO case. The second data stream encoded on a second downlink signal using codebook index B can be routed to the output port 222b, as described above with respect to the MU-MIMO case. The first downlink signal outputted at the output port 222a can be provided to one or more remote antenna units 116a of the segment A and the second downlink signal outputted at the output port 222b can be provided to one or more remote antenna units 116b of the segment C. The data streams corresponding to the two different signals can be combined by a terminal device configured for MIMO operation that receives the two signals from the DAS 100. For example, a first receiver antenna of the terminal device can receive the first downlink signal from one or more remote antenna units 116a and a second receiver antenna of the terminal device can receive the second downlink signal from one or more remote antenna units 116b.

In some aspects, the splitter unit 106 can include circuitry such as (but not limited to) a Butler matrix. A Butler matrix can split two streams on physical ports (e.g., ports A-D) for MU-MIMO operation such that two ports A (90°) and C (270°) are paired and two ports B (180°) and D (0°) are paired. In SU-MIMO operations, two streams may usually be mapped to distinct antenna ports using code book entry 0. Using a Butler matrix, these streams can be combined, which may be undesirable. However, codebook entries 1 and 2 can implement the inverse operation for the Butler matrix. For example, a first codebook can be used for single-stream transmission (e.g., one terminal device or two terminal device in case of MU-MIMO) and a second codebook can be used for multi-stream transmission (e.g., SU-MIMO). For MU-MIMO, one codebook index is associated with one stream and in SU-MIMO, one codebook index is associated with the operations to be applied for both streams. With SU-MIMO, the first stream is outputted at a port corresponding to a Codebook Index A and the second stream is outputted at a port corresponding to a Codebook Index C. Additionally or alternatively, with SU-MIMO, the first stream is outputted at a port corresponding to a Codebook Index B and the second stream is outputted at a port corresponding to a Codebook Index D.

For example, a Butler matrix can provide phase shifts of 90 degrees between two downlink signals received via the input ports 218, 220. A four-port Butler matrix can include four 90-degree output ports 222, 222b, 222c, 222d. The output port 222a can be a 90-degree port associated with codebook index A. The output port 222b can be a 180-degree port associated with codebook index B. The output port 222c can be a 270-degree port associated with codebook index C. The output port 222d can be a 0-degree or 360-degree port associated with codebook index D. In additional or alternative aspects, a splitter unit 106 can be implemented as Butler matrix having other numbers of output ports (e.g., eight output ports, sixteen output ports, etc.).

In some aspects (e.g., those involving transmit diversity), the base station 101 can transmit two downlink signals that are uncorrelated. For example, for a data stream transmitted with codebook index A, the base station 101 can transmit two downlink signals via the downlink ports 208, 212 that are uncorrelated with one another. The splitter unit 106 can be configured to divide the total signal power of the two input signals into four output signals having equal power.

The splitter unit 106 can allow the base station 101 to utilize the DAS 100 for transmitting signals using a transmit diversity configuration, a SU-MIMO configuration or a MU-MIMO configuration. For instance, in an interleaved scheme where a terminal device can receive signals from two radiating points (e.g., two remote antenna units), two data streams can be transmitted to the terminal device via the DAS. Terminal devices that can communicate with one radiating point (e.g., one remote antenna unit) can be serviced using a MU-MIMO configuration. Downlink signals for multiple terminal devices can be combined if the signals are related. Related signals can include signals being provided to coverage zones within a given distance of one another (e.g., two floors of a building). Combining downlink signals can allow for balancing the throughput and other wireless performance characteristics of multiple terminal devices via MU-MIMO. In some aspects, balancing the throughput and other wireless performance characteristics of multiple terminal devices via MU-MIMO can allow the DAS 100 to utilize all features of the LTE specification.

For example, a first terminal device can be located in segment A and a second terminal device can be located in segment C. The base station can transmit a first data stream to the first terminal device via the DAS 100 using codebook index A. The base station can transmit a second data stream to the second terminal device via the DAS 100 using codebook index C.

Figure 3A:
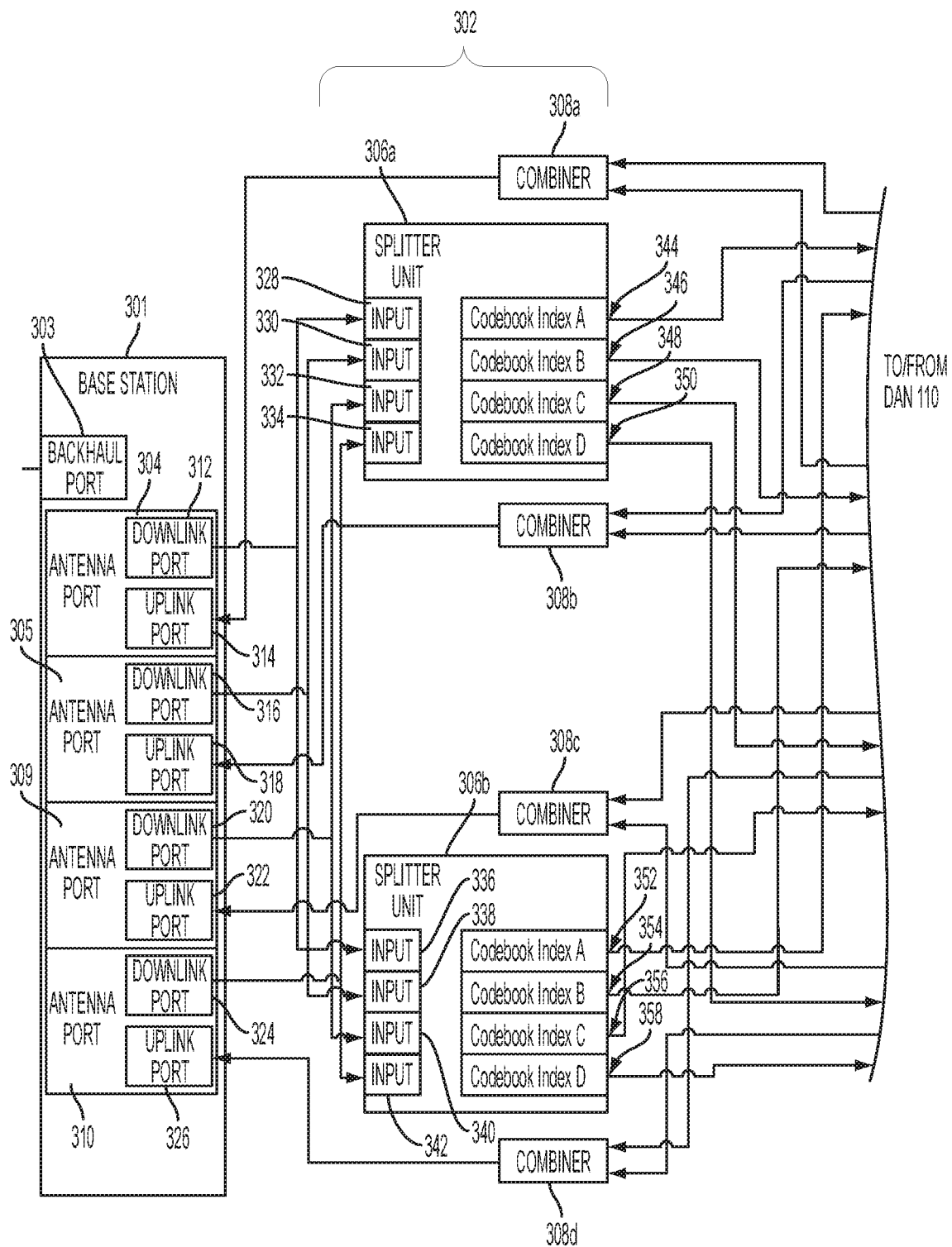
FIGS. 3A and 3B are block diagrams depicting an example of a DAS that can be used by a four-port base station for MIMO operation according to one aspect of the present disclosure.
Figure 3B:
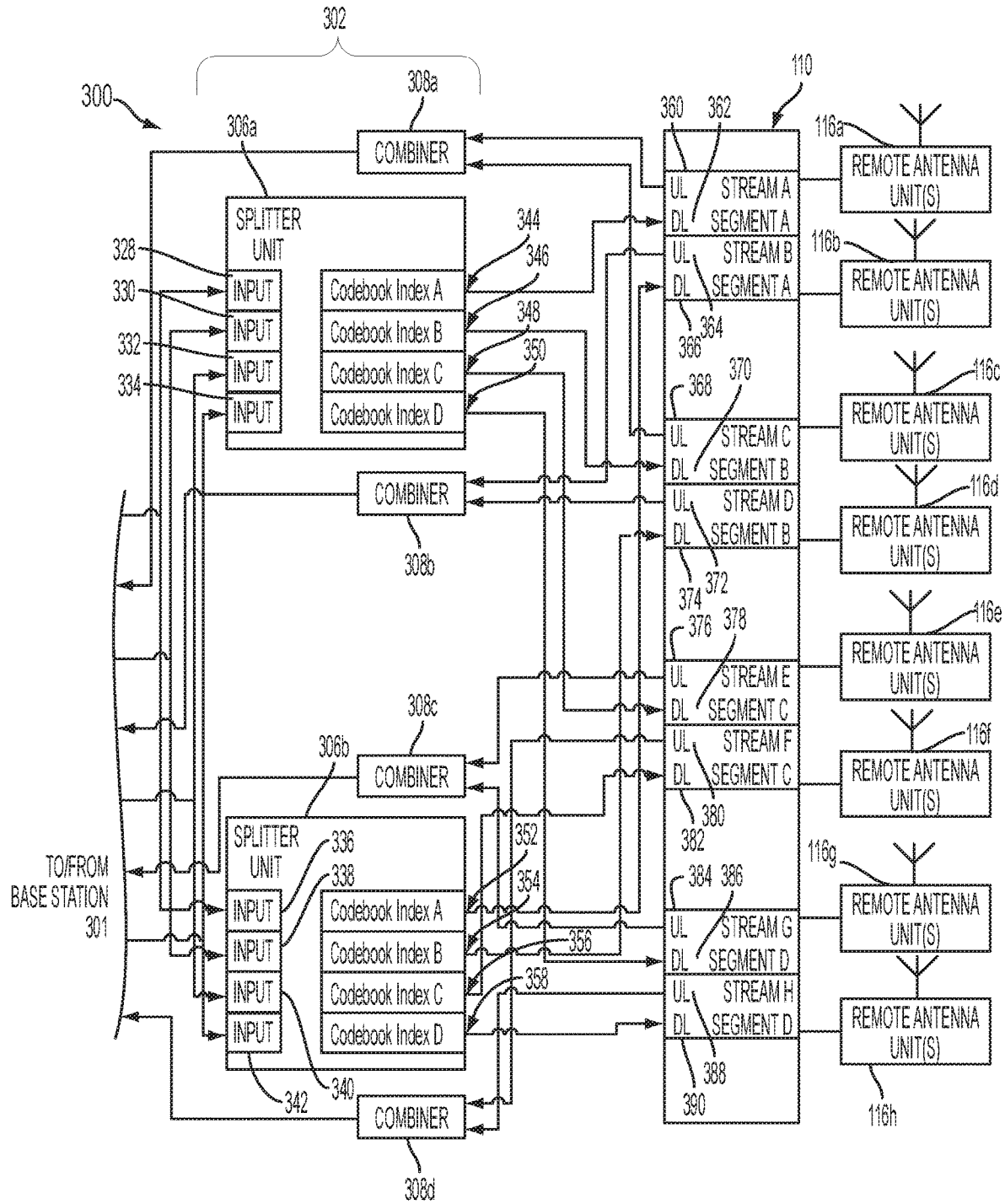

FIGS. 3A and 3B are block diagrams depicting an example of a DAS 300 that can be used by a four-port base station 301 for MIMO operation. For example, a base station 301 having four antenna ports 304, 305, 309, 310 can communicate downlink signals to coverage zones, where each coverage zone includes at least two antenna elements for transmitting data streams to a terminal device. In some aspects, a coverage zone having at least two antenna elements can include a coverage zone in which two remote antenna units are positioned, where each remote antenna unit has a single antenna element. In other aspects, a coverage zone having at least two antenna elements can include a coverage zone in which a remote antenna unit having two antenna elements is positioned.

Although FIGS. 3A and 3B depict an implementation suitable for using a base station having four antenna ports to communicate with a coverage zone having at least two antenna elements (e.g., a remote antenna unit with two antennas), other implementations are possible. This configuration can allow for MU-MIMO operation in which four data streams are transmitted to two terminal devices simultaneously, with each terminal device receiving a respective two streams of the four data streams. For example, a base station having four antenna ports can be used to communicate with up to sixteen coverage zones, each of which has one antenna element (e.g., a remote antenna unit with one antenna). In such an example, the base station can use the DAS for MU-MIMO operation, where the same frequency resources are used to simultaneously transmit two different data streams to different terminal devices in spatially separated or otherwise isolated coverage zones.

A master unit 302 can include splitter units 306a, 306b and combiner units 308a-d. For illustrative purposes, other components of the master unit 302 are omitted from FIG. 3. The splitter units 306a, 306b can emulate a radio configuration in which a dual cross-polar antenna provides a spacing of $\lambda/2$ distance between the columns of the antenna. Each of the splitter units 306a, 306b can emulate two $\lambda/2$ spaced antennas with a given polarization. The base station 301 can use both polarizations to transmit independent information on a first data stream and a second data stream towards a terminal device. The base station 301 can also use the splitter units 306a, 306b to transmit downlink signals to two terminal devices that are spatially separated from one another. The base station 301 can use both polarizations to transmit independent information on a first data stream and a second data stream towards a first terminal device and a third data stream and a fourth data stream towards a second terminal. In some aspects, the splitter units 306a, 306b can be implemented digitally. In other aspects, the splitter units 306a, 306b can be implemented using passive RF circuitry.

The splitter units 306a, 306b can be communicatively connected to the base station 301 via the input ports 328, 330, 332, 334, 336, 338, 340, 342. In some aspects, communicatively connecting the splitter units 306a, 306b to the base station 301 can involve using a wired connection to communicate signals between the splitter units 306a, 306b and the base station 301. In additional or alternative aspects, communicatively connecting the splitter units 306a, 306b to the base station 301 can involve using a wireless connection to communicate signals between the splitter units 306a, 306b and the base station 301. In some aspects, a communicative connection between the splitter units 306a, 306b and the base station 301 can be a direct connection, as depicted in FIG. 3. In additional or alternative aspects, a communicative connection between one or more of the splitter units 306a, 306b and the base station 301 can involve connections to one or more intermediate devices (e.g., a point-of-interface device for a DAS 300) located between the splitter unit 306 and the base station 301 in a signal path.

In a downlink direction, four downlink signals can be transmitted from the base station 301 to the master unit 302 via the downlink ports 312, 316, 320, 324, respectively. Each of the downlink signals transmitted via the one of the downlink ports 312, 316, 320, 324 can be divided or otherwise separated into two downlink signals by the master unit 302. Each of the separated downlink signals can be routed by the master unit 302 to an input port of one of the splitter units 306a, 306b. For example, a downlink signal from a downlink port 312 can be provided to an input port 328 of the splitter unit 306a and to an input port 336 of the splitter unit 306b.

As depicted in FIG. 3A, a base station 301 in communication with the master unit 302 can include a backhaul port 303 and antenna ports 304, 305, 309, 310. The antenna port 304 can include an uplink port 314 (or uplink port functionality) and a downlink port 312 (or downlink port functionality). The antenna port 305 can include an uplink port 318 (or uplink port functionality) and a downlink port 316 (or downlink port functionality). The antenna port 309 can include an uplink port 322 (or uplink port functionality) and a downlink port 320 (or downlink port functionality). The antenna port 310 can include an uplink port 326 (or uplink port functionality) and a downlink port 324 (or downlink port functionality).

The master unit 302 can include splitter units 306a, 306b and combiner units 308a, 308b. The splitter unit 306a can include input ports 328, 330, 332, 334 and output ports 344, 346, 348, 350. The splitter unit 306b can include input ports 336, 338, 340, 342 and output ports 352, 354, 356, 358. Each of the splitter units 306a, 306b can receive downlink signals from at least two of the downlink ports 312, 316, 320, 324. Each of the splitter units 306a, 306b can output downlink signals to one or more remote antenna units via the DAN 110.

As depicted in FIG. 3B, the master unit 302 can provide downlink signals to sets of remote antenna units 116a-h via the DAN 110. Each of the sets of remote antenna units 116a-h can include one or more remote antenna units in a coverage zone of the DAS 300. The DAN 110 can receive downlink signals 362, 366, 370, 374, 378, 382, 386, 390 from the master unit 302 and provide the downlink signals to coverage zones of the DAS 300. For example, the DAN 110 can receive downlink signals 362, 366, 370, 374, 378, 382, 386, 390 and transmit the downlink signals 362, 366, 370, 374, 378, 382, 386, 390 to respective sets of remote antenna units 116a-h. The DAN 110 can also provide uplink signals 360, 364, 368, 372, 376, 380, 384, 388 to the master unit 302. For example, the DAN 110 can receive uplink signals 360, 364, 368, 372, 376, 380, 384, 388 from respective sets of remote antenna units 116a-h.

The splitter units 306a, 306b can be communicatively connected to the DAN 110 via the output ports 344, 346, 348, 350, 352, 354, 356, 358. In some aspects, communicatively connecting the splitter units 306a, 306b to the DAN 110 can involve using a wired connection to communicate signals between the splitter units 306a, 306b and the DAN 110. In additional or alternative aspects, communicatively connecting the splitter units 306a, 306b to the DAN 110 can involve using a wireless connection to communicate signals between the splitter units 306a, 306b and the DAN 110. In some aspects, a communicative connection between the splitter units 306a, 306b and the DAN 110 can be a direct connection, as depicted in FIG. 3. In additional or alternative aspects, a communicative connection between the splitter units 306a, 306b and the DAN 110 can involve connections to one or more intermediate devices located between the splitter units 306a, 306b and the DAN 110 in one or more signal paths.

The sets of remote antenna units 116a-h can be organized into segments. For example, segment A can include one or more remote antenna units 116a, and one or more remote antenna units 116b. Segment B can include one or more remote antenna units 116c and one or more remote antenna units 116d. Segment C can include one or more remote antenna units 116e and one or more remote antenna units 116f. Segment D can include one or more remote antenna units 116g and one or more remote antenna units 116h.

In each segment, a first antenna element can be used to transmit a first data stream and a second antenna element can be used to transmit a second data stream. For example, in segment A, stream A can be transmitted using one or more remote antenna units 116a and stream C can be transmitted using one or more remote antenna units 116b. Streams A and C can be transmitted by the base station 301 in downlink signals encoded using a codebook index A. In some aspects, in segment C, stream B can be transmitted using one or more remote antenna units 116c and stream D can be transmitted using one or more remote antenna units 116d. Streams B and D can be transmitted by the base station 301 in downlink signals encoded using a codebook index B. In additional or alternative aspects, in segment B, stream A can be transmitted using one or more remote antenna units 116e and stream C can be transmitted using one or more remote antenna units 116f. Streams A and C can be transmitted by the base station 301 in downlink signals encoded using a codebook index B. In segment D, stream B can be transmitted using one or more remote antenna units 116g and stream D can be transmitted using one or more remote antenna units 116h. Streams B and D can be transmitted by the base station 301 in downlink signals encoded using a codebook index D.

Each of the splitter units 306a, 306b can be configured such that a combined signal power from downlink signals that are received from two of the input ports is provided to one or more of the output ports of the splitter unit. For example, the splitter unit 306a can be configured such that downlink signals received at input ports 332, 334 from downlink ports 320, 324 of the base station 301 are discarded or otherwise not used. The splitter unit 306b can be configured such that downlink signals received at input ports 336, 338 from downlink ports 312, 316 of the base station 301 are discarded or otherwise not used. In some aspects, two input ports from each of the splitter units can be disconnected from the output ports of the splitter unit or terminated in a high-impedance load such that downlink signals received at those inputs are discarded or otherwise not used by the splitter unit.

In other aspects, a splitter unit 306a may not include input ports 332, 334 and a splitter unit 306b may not include input ports 336, 338.

In a downlink direction, the DAS 300 may operate by receiving downlink signals encoded using certain codebook indices and transmitting the downlink signals in certain coverage areas based on the codebook indices. For example, remote antenna units in a coverage zone may radiate signals on a frequency assigned to the terminal device. The terminal device may request a codebook index depending on the terminal device's measurements of the signals radiated by one or more of the remote antenna units. The base station 301 may apply the requested codebook entry.

The base station 301 can be configured for SU-MIMO operation such that at least two data streams can be transmitted via the DAS 300 to a first terminal device being serviced by a first DAS segment and at least two additional data streams can be transmitted via the DAS 300 to a second terminal device being serviced by a second DAS segment. For example, the base station 301 can transmit a first set of downlink signals via the downlink ports 312, 320. The first set of downlink signals can be encoded using a first codebook index (e.g., codebook index A). The first set of downlink signals can include a first downlink signal encoded with a first data stream (e.g., stream A) and a second downlink signal encoded with a second data stream data stream (e.g., stream C). The base station 301 can also transmit a second set of downlink signals via the downlink ports 316, 320. The second set of downlink signals can be encoded using a second codebook index (e.g., codebook index C). The second set of downlink signals can include a third downlink signal encoded with a third data stream (e.g., stream B) and a fourth downlink signal encoded with a second data stream data stream (e.g., stream D).

The codebook indices used to transmit signals via the DAS 300 can be selected such that the splitter units 306a, 306b provide different downlink signals encoded using different codebook indices to different segments of the DAS 300. For example, the splitter unit 306a can be configured such that a first combined signal power from two downlink signals having a first phase difference are provided from the input ports 328, 330 to the output port 344 that is respectively associated with codebook index A. The splitter unit 306a can also be configured such that a second combined signal power from the two downlink signals having the first phase difference are provided from the input ports 328, 330 to the output port 348 that is respectively associated with codebook index C. In the uplink direction, uplink signals from terminal devices sharing the same frequency resource (e.g., in segments B and C depicted in FIG. 3B) can be routed to different uplink ports of the base station 301. In a similar manner, the splitter unit 306b can be configured such that combined signal powers from two additional downlink signals having the first phase difference are provided from the input ports 340, 342 to the output ports 352, 356 that are respectively associated with codebook indices A, C. The splitter unit 306a can also be configured such that two combined signal powers generated from two downlink signals having a second phase difference are provided from the input ports 328, 330 to the output ports 346, 350 that are respectively associated with codebook indices B, D. The splitter unit 306b can be configured such that two additional combined signal powers from two additional downlink signals having the second phase difference are provided from the input ports 340, 342 to the output ports 354, 358 that are respectively associated with codebook indices B, D.

A phase difference among downlink signals transmitted via the downlink ports 312, 316, 320, 324 can control the operation of the splitter units 306a, 306b in outputting the downlink signals at various ports in the same manner as described above with respect to FIG. 2. For example, a phase difference of +180 degrees may exist between two downlink signals outputted by the base station 301 at downlink ports 312, 316 and received by the splitter unit 306a via the input ports 328, 330. The phase difference of +180 degree can cause the splitter unit 306a to provide the signal power associated with a first data stream A to the output port 344 associated with the codebook index A and to provide the signal power associated with a second data stream C to the output port 346 associated with the codebook index B. A phase difference of +180 degrees may also exist between two downlink signals outputted by the base station 301 at downlink ports 320, 324 and received by the splitter unit 306b via the input ports 340, 342. The phase difference of +180 degree can cause the splitter unit 306b to provide the signal power associated with a third data stream A to the output port 354 associated with the codebook index A and to provide the signal power associated with a fourth data stream C to the output port 356 associated with the codebook index B. For another set of downlink signals, a phase difference of +180 degrees between downlink signals encoded with Codebook indices C and D and received at two input ports of a splitter unit may cause the splitter units 106 to provide signal power associated with the two data streams to output ports associated with the Codebook indices C and D.

In the uplink direction, uplink signals can be provided to combiner units 308a-d. Streams of uplink signals from adjacent segments of remote antenna units can be combined by each hybrid combiner. For example, the combiner unit 308a can receive streams A and C from segments A and B and can combine the streams into a combined uplink signal. The combiner unit 308b can receive streams B and D from segments A and B and can combine the streams into a combined uplink signal. The combiner unit 308c can receive streams E and G from segments C and D and can combine the streams into a combined uplink signal. The combiner unit 308a can receive streams 1 from segments F and H and can combine the streams into a combined uplink signal. Doing so can allow, in the uplink direction, uplink signals from terminal devices sharing the same frequency resource to be routed to different uplink ports of the base station 301.

The DAS 300 can be used to implement various beamforming techniques by splitting the downlink signals using the splitter units 306a, 306b. For example, a terminal device can monitor two downlink communication channels associated with the respective downlink ports 312, 316 of the base station 301. If the terminal device detects a 90 degree difference between two signals respectively transmitted via the two downlink communication channels associated with the respective downlink ports 312, 316, the terminal device can request that the base station 301 precode the downlink signals such that the downlink signals received by the terminal device have the same phase. Any suitable signaling process can be used by the terminal device to instruct the base station 301.

In some aspects, a terminal device may be located in between two remote segments the DAS 300. The DAS 300 can be configured for MIMO operation to transmit downlink signals to the terminal device. For example, the terminal device may determine that it can receive two downlink signals. The terminal device can transmit feedback data to the base station 301 about the downlink signals. The base station 301 can use the feedback data to determine which remote antenna units transmitted the downlink signals. For example, the base station may determine from the feedback data that the downlink signals were transmitted from segments A and B. The base station 301 can subsequently transmit MIMO streams via downlink ports 312, 316 to the terminal device. The MIMO streams can be independent downlink signals transmitted via the downlink ports 312, 316. The splitter unit 306a can receive the two signals via the input ports 328, 330. The splitter unit 306a can determine that the two signals received via the respective input ports 328, 330 have different phases. The splitter unit 306a can provide the first signal corresponding to a first MIMO stream to the output port 344 associated with a codebook index A. The splitter unit 306a can provide the second signal corresponding to a second MIMO stream to the output port 346 associated with a codebook index B.

Options for uplink operation may be different for SISO or other single-stream transmission and MIMO configurations. For example, as shown in the SISO or other single-stream transmission configuration in FIGS. 3-4, uplink signals from segments A and B can be combined and received via one or more of the uplink ports 314, 322, and uplink signals from segments C and D can be combined and received via one or more of the uplink ports 318, 326. Separately combining the uplink signals associated with different segments can provide a spatial separation that allows for MU-MIMO in the uplink direction. For example, in an uplink direction, each terminal device may have only one transmitter. The reference configuration for this situation is a SIMO configuration. Due to the arrangement of the combiners corresponding to the pairing rule (A+C, B+D) in the downlink direction, the base station 310 can separate the uplink signals received from two paired terminal devices that are located in spatially separated areas (e.g., two SIMO terminal devices can correspond to MU-MIMO operation).

As depicted in FIGS. 3A and 3B, signals from both polarizations can be received independently by the base station 301. For example, the combiner units 308a, 308c receive uplink signals associated with a first stream from the remote antenna units and the combiner units 308b, 308d receive uplink signals associated with a second stream from the remote antenna units. One or more of uplink ports 314, 322 can be associated with a first polarization and one or more of uplink ports 318, 326 can be associated with a second polarization. By maintaining separate and independent uplink signal paths for each polarization, receive diversity or dual stream reception and MU-MIMO in the uplink direction can be supported if spatial separation between the terminal devices is available.

Figure 4:
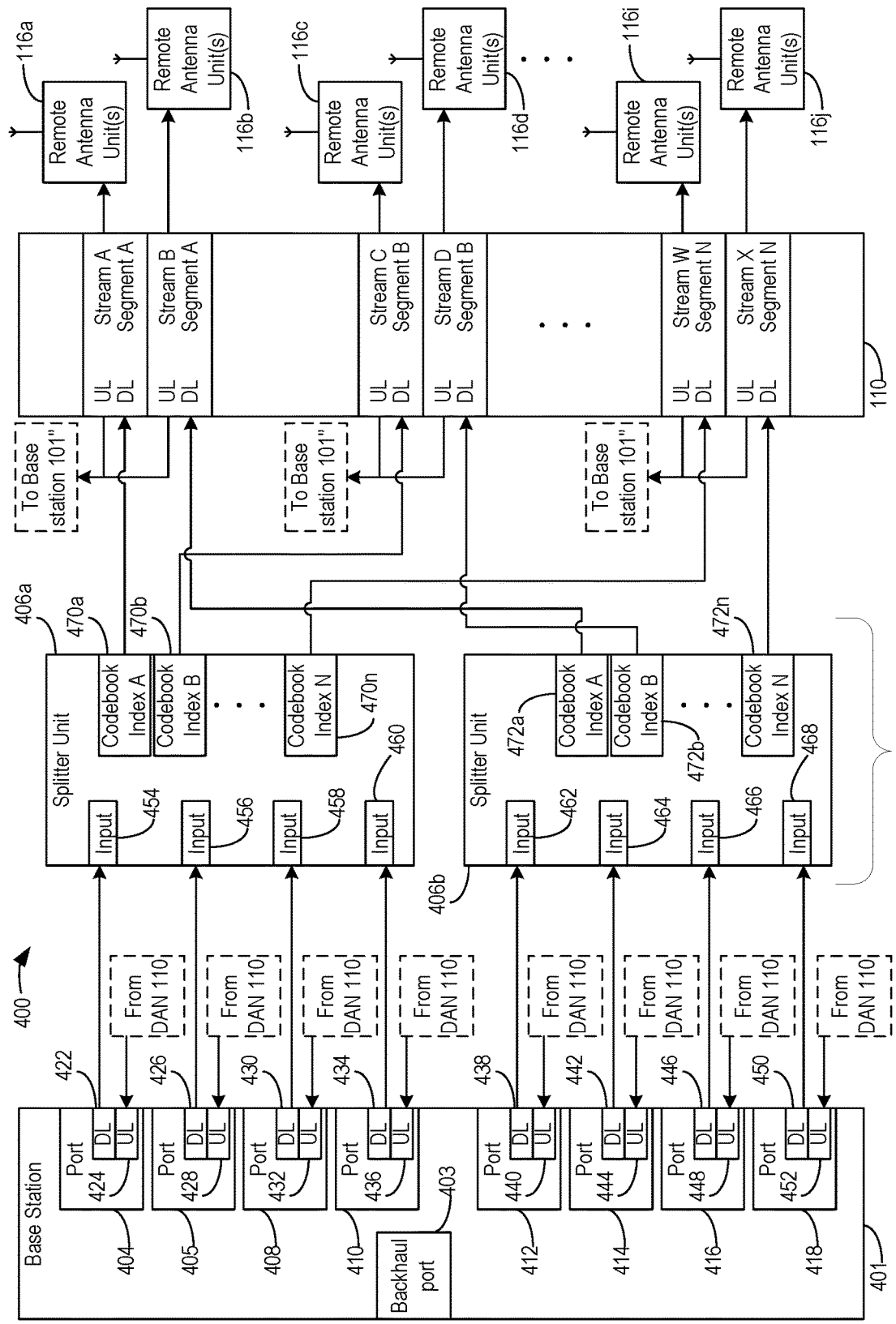
FIG. 4 is a block diagram depicting an example of a DAS that can be used by an eight-port base station for MIMO operation according to one aspect of the present disclosure.

In some aspects, a base station can include additional numbers of antenna ports for providing data streams to a DAS 100. For example, FIG. 4 is a block diagram depicting an example of a DAS 400 that can be used by an eight-port base station 400 for MIMO operation. For simplicity of illustration, components of the uplink paths between the remote antenna units and the base station are omitted from FIG. 4.

As depicted in FIG. 4, a base station 401 in communication with a master unit 402 can include a backhaul port 403 and antenna ports 404, 405, 408, 410, 412, 416, 418. The antenna port 404 can include a downlink port 422 (or downlink port functionality) and an uplink port 424 (or uplink port functionality). The antenna port 405 can include a downlink port 426 (or downlink port functionality) and an uplink port 428 (or uplink port functionality). The antenna port 408 can include a downlink port 430 (or downlink port functionality) and an uplink port 432 (or uplink port functionality). The antenna port 410 can include a downlink port 434 (or downlink port functionality) and an uplink port 436 (or uplink port functionality). The antenna port 412 can include a downlink port 438 (or downlink port functionality) and an uplink port 440 (or uplink port functionality). The antenna port 414 can include a downlink port 442 (or downlink port functionality) and an uplink port 444 (or uplink port functionality). The antenna port 416 can include a downlink port 446 (or downlink port functionality) and an uplink port 448 (or uplink port functionality). The antenna port 418 can include a downlink port 450 (or downlink port functionality) and an uplink port 452 (or uplink port functionality).

The master unit 402 can include splitter units 406a, 406b. The splitter unit 406a can include input ports 454, 456, 458, 460 and output ports 470a-n. Each of the output ports 470a-n can be used to output a respective downlink signal associated with a respective one of the codebook indices A-N. (Although, for illustrative purposes, the number of output ports 470a-n corresponds to the number of codebooks indices, the number of output ports of splitter unit 406a can differ from the number of codebooks indices.) The splitter unit 406b can include input ports 462, 464, 466, 468 and output ports 472a-n. Each of the output ports 472a-n can be used to output a respective downlink signal associated with a respective one of the codebook indices A-N. (Although, for illustrative purposes, the number of output ports 472a-n corresponds to the number of codebooks indices, the number of output ports of splitter unit 406b can differ from the number of codebooks indices.) In some aspects, the splitter units 406a, 406b can be implemented digitally. In other aspects, the splitter units 406a, 406b can be implemented using passive RF circuitry. For illustrative purposes, other components of the master unit 402 are omitted from FIG. 4.

The splitter units 406a, 406b can be communicatively connected to the base station 401 via the input ports 454, 456, 458, 460, 462, 464, 466, 468. In some aspects, communicatively connecting the splitter units 406a, 406b to the base station 401 can involve using a wired connection to communicate signals between the splitter units 406a, 406b and the base station 401. In additional or alternative aspects, communicatively connecting the splitter units 406a, 406b to the base station 401 can involve using a wireless connection to communicate signals between the splitter units 406a, 406b and the base station 401. In some aspects, a communicative connection between the splitter units 406a, 406b and the base station 401 can be a direct connection, as depicted in FIG. 4. In additional or alternative aspects, a communicative connection between one or more of the splitter units 406a, 406b and the base station 401 can involve connections to one or more intermediate devices (e.g., a point-of-interface device for a DAS 400) located between the splitter unit 406 and the base station 401 in a signal path.

The splitter units 406a, 406b can be communicatively connected to the DAN 110 via the output ports 470a-n, 772a-n. In some aspects, communicatively connecting the splitter units 406a, 406b to the DAN 110 can involve using a wired connection to communicate signals between the splitter units 406a, 406b and the DAN 110. In additional or alternative aspects, communicatively connecting the splitter units 406a, 406b to the DAN 110 can involve using a wireless connection to communicate signals between the splitter units 406a, 406b and the DAN 110. In some aspects, a communicative connection between the splitter units 406a, 406b and the DAN 110 can be a direct connection, as depicted in FIG. 3. In additional or alternative aspects, a communicative connection between the splitter units 406a, 406b and the DAN 110 can involve connections to one or more intermediate devices located between the splitter units 406a, 406b and the DAN 110 in one or more signal paths.

The master unit 402 can provide downlink signals to a suitable number of segments A-N of remote antenna units via the DAN 110. For example, for a DAS using codebook indices, the master unit 402 may provide downlink signals to up to sixteen segments of remote antenna units via the DAN 110. Each segment of remote antenna units can include at least two antenna elements (e.g., a first remote antenna unit that has a single antenna and a second remote antenna unit that has a single antenna, one remote antenna unit having two antennas, etc.). For example, as depicted in FIG. 4, remote antenna units 116a-j can include a sufficient number of remote antenna units such that two remote antenna units can be included in a given segment. Segment A can include remote antenna units 116a, 116b. Segment B can include remote antenna units 116c, 116d. Segment N can include remote antenna units 116i, 116j. In additional or alternative aspects, each of the segments A-N can be serviced using at least one respective antenna unit having two antennas. Having segments A-N with multiple antenna elements in each segment can allow the DAS 100 to be configured for one or more of SU-MIMO operation and MU-MIMO in a coverage zone serviced by a segment. In some aspects involving the use of codebook indexes, a base station can support two terminals. In other aspects involving beam-steering, a base station can support more than two terminals.

Each of the segments A-N can transmit a first downlink signal corresponding to a first data via first antenna element and a second downlink signal corresponding to a second data via second antenna element. For example, in segment A, one or more remote antenna units 116a can transmit downlink signals associated with a first data stream A and one or more remote antenna units 116b can transmit downlink signals associated with a second data stream B. In segment B, one or more remote antenna units 116c can transmit downlink signals associated with a first data stream C and one or more remote antenna units 116b can transmit downlink signals associated with a second data stream D. In segment N, one or more remote antenna units 116i can transmit downlink signals associated with a first data stream W and one or more remote antenna units 116j can transmit downlink signals associated with a second data stream X.

For SU-MIMO or MU-MIMO operation, the base station 401 can use a first set of four antenna ports to transmit four downlink signals associated with a first data stream. The base station 401 can also use a second set of four antenna ports to transmit four downlink signals associated with a second data stream. For example, the inclusion of at least two antenna elements (i.e., remote antenna units 116a, 116b) in segment A can allow DAS 100 to transmit two MIMO streams (either for SU-MIMO or MU-MIMO) from the base station 401 in the coverage zone serviced by the segment A. The base station 401 can transmit a first data stream by transmitting four downlink signals via respective downlink ports 422, 426, 430, 434. The base station 401 can transmit a second data stream by transmitting four additional downlink signals via respective downlink ports 438, 442, 446, 450. The first set of downlink signals for the first data stream and the second set of downlink signals for the second data stream can be encoded using a codebook index A.

The splitter units 406a, 406b can be configured such that each splitter unit can provide the signal power from a set of four downlink signals to a given output port of the splitter unit based on a given phase difference among the four downlink signals that corresponds to a given codebook index. In one example, four downlink signals received by the splitter unit 406a via the respective input ports 454, 456, 458, 460 may be encoded by the base station 401 using a codebook index A. Encoding the four downlink signals using the codebook index A can result in phase differences among the four downlink signals that is characteristic of the codebook index A. The splitter unit can be configured such that these phase differences cause the signal power of the four downlink signals to be combined and outputted via the output port 470a that is associated with codebook index A. Outputting the combined downlink signals via the output port 470a can cause the data stream associated with the combined downlink signals to be provided to the segment A. A second data stream can be provided to segment A if four additional downlink signals received by the splitter unit 406b via the respective input ports 462, 464, 466, 468 are encoded by the base station 401 using the codebook index A. The splitter unit 406b can be configured such that phase differences associated with the codebook index A cause the signal power of the four additional downlink signals to be combined and outputted via the output port 472a that is associated with codebook index A. Outputting the combined downlink signals via the output port 472a can cause the second data stream associated with the combined downlink signals to be provided to the segment A. In some aspects, the first and second data streams can be transmitted using SU-MIMO to a terminal device having at least two receiver antenna elements (i.e., a terminal device configured for SU-MIMO operation). In additional or alternative aspects, the first and second data streams can be transmitted using MU-MIMO to two different terminal devices, each of which has at least one receiver antenna element (i.e., terminal devices configured for MU-MIMO operation).

Any suitable implementation can be used to provide uplink signals from the remote antenna units 116a-j to the base station 401 via the DAS 400. In some aspects, a base station can include a number of antenna ports that is greater than or equal to the number of segments of remote antenna units. Uplink signals from a given segment can be provided to a corresponding antenna port without combining the uplink signals with up signals from another segment. In other aspects, a base station can include a number of antenna ports that is less than the number of segments of remote antenna units. Uplink signals from different segments can be combined and provided to the same antenna port of the base station. In one example, a combiner can be used to combine uplink signals from different segments. In another example, an inverse splitter can be used to combine uplink signals from different segments.

Figure 5:
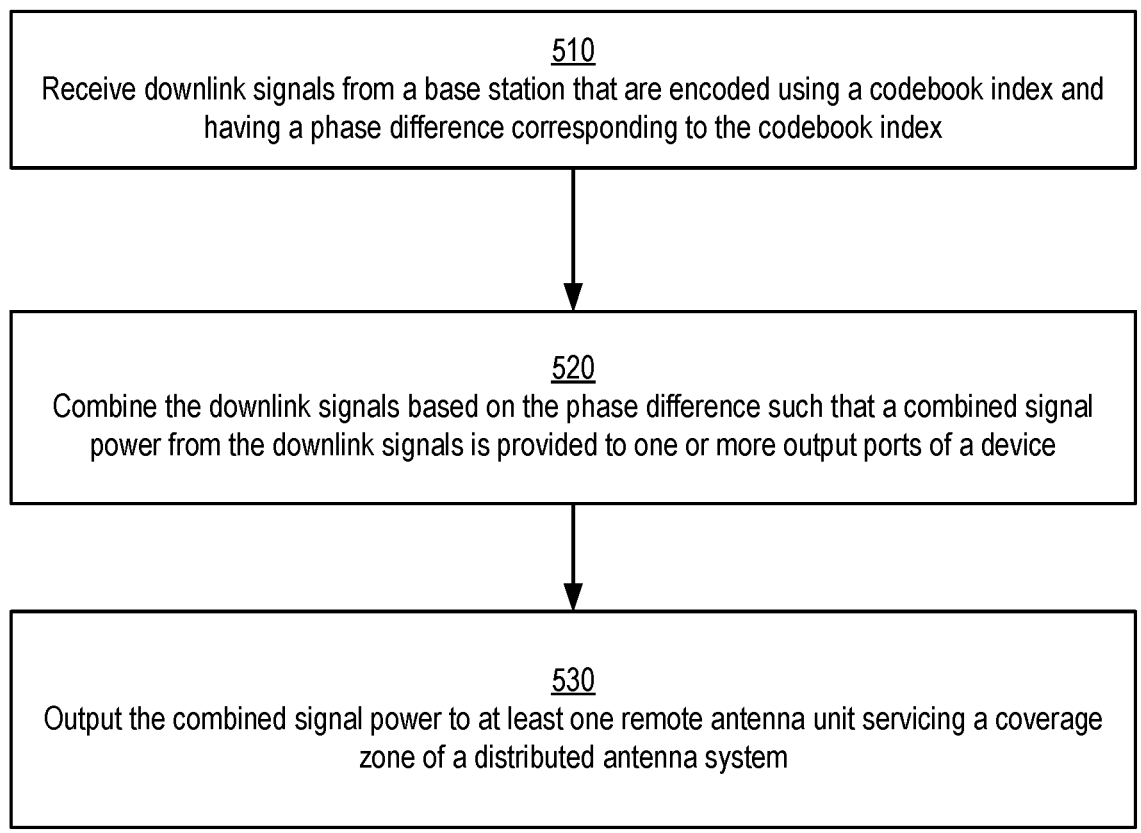
FIG. 5 is a flow chart depicting an example of a process for performing both single-stream transmission and MIMO operations using a spatial sub-system of a DAS according to one aspect of the present disclosure.

FIG. 5 is a flow chart depicting an example of a process 500 for performing both SISO or other single-stream transmission and MIMO operations using a spatial sub-system of a DAS. The process 500 is described with respect to one or more of the aspects and examples described above with respect to FIGS. 1-4. Other implementations, however, are possible.

The process 500 involves receiving downlink signals from a base station that are encoded using a codebook index and that have a phase difference corresponding to the codebook index, as depicted in block 510. In some aspects, a splitter unit can receive, via at least two input ports, at least two downlink signals from a base station that are encoded using a codebook index and that have a phase difference corresponding to the codebook index. For example, any of the splitter units depicted in FIGS. 1-4 can receive downlink signals via input ports. In some aspects, a single splitter unit configured for MIMO operation (either SU-MIMO or MU-MIMO) can receive two downlink signals via two input ports, as described above with respect to FIG. 2. In other aspects, two splitters unit configured for MIMO operation (e.g., SU-MIMO, MU-MIMO) can be used to receive four downlink signals via at least two input ports of each splitter unit, as described above with respect to FIGS. 3A and 3B. In other aspects, two splitters unit configured for MIMO operation (e.g., SU-MIMO, MU-MIMO) can be used to receive eight downlink signals via at least four input ports of each splitter unit, as described above with respect to FIG. 4.

The process 500 also involves combining the downlink signals based on the phase difference such that a combined signal power from the downlink signals is provided to one or more output ports of a device, as depicted in block 520. In some aspects, a splitter unit can combine the downlink signals based on the phase difference such that a combined signal power from the downlink signals is greater at an output port of the splitter unit than at other output ports of the splitter unit. For example, any of the splitter units depicted in FIGS. 1-4 can combine the received downlink signals based on phase differences among the downlink signals such that one or more sets of combined signal power are provided to one or more output ports. In some aspects, combining the received downlink signals based on the phase difference can cause the combined signal power to be greater at one output port than at other output ports, as described above with respect to transmit diversity operations. In other aspects, combining the received downlink signals based on the phase difference can cause the combined signal power to be greater at some of the output ports and weaker at other output ports, as described above with respect to the MIMO operations in FIGS. 2-4. For example, a first combined signal power from two or more downlink signals can correspond to a first data stream and a second combined signal power from two or more downlink signals can correspond to a second data stream. The first combined signal power can be provided to a first output port of a splitter unit for routing to a first coverage zone. The second combined signal power can be provided to a second output port of the splitter unit for routing to a second coverage zone. At output ports other than the first and second output ports, little or no signal power may be generated by combining the downlink signals.

The process 500 also involves outputting, via one of the output ports, the combined signal power to at least one remote antenna unit servicing a coverage zone of a distributed antenna system, as depicted in block 530. For example, a downlink signal having the combined signal power generated by a splitter unit can be transmitted via an output port to one or more remote antenna units in a segment of a DAS that services a given coverage zone. In MIMO operations, a first downlink signal having a first combined signal power generated by a splitter unit can be transmitted via a first output port to one or more remote antenna units servicing a first coverage zone and a second combined signal power generated by a splitter unit can be transmitted via a second output port to one or more remote antenna units servicing a second coverage zone, as described above with respect to FIGS. 2-4.

In additional or alternative aspects, additional splitter units can be used to support one or both of SU-MIMO operations and MU-MIMO operations. For example, an additional splitter unit can receive two or more additional downlink signals via two or more input ports of the additional splitter unit. The additional splitter unit can combine the received based on a phase difference corresponding to a codebook index such that a combined signal power from the downlink signals is greater at one or more of the output ports of the additional splitter unit than at other output ports of the additional splitter unit. Both splitter units may transmit respective downlink signals with respective combined signal powers corresponding to respective data streams. For SU-MIMO operation, the downlink signals corresponding to the two data streams can be transmitted to a common coverage zone serviced by one or more remote antenna units having at least two antenna elements. For MU-MIMO operation, the downlink signals corresponding to the two data streams can be transmitted to different, spatially separated coverage zones serviced by different sets of remote antenna units. In some aspects, a terminal device that is configured for SU-MIMO can be positioned at or near a boundary between two coverage zones. Downlink signals corresponding to two data streams can be transmitted to different, spatially separated coverage zones serviced by different sets of remote antenna units. The different sets of remote antenna units can transmit the different data streams to the same terminal device that is positioned at or near a boundary between the two coverage zones.

In some aspects, codebook indices can be selected by a base station using feedback data from terminal devices. A terminal device that is a MIMO receiving device can measure or otherwise determine one or more conditions of a communication channel between the terminal device and one or more of the remote antenna units 116a, 116b, 116c of the DAS 100. The terminal device can generate feedback data describing the measured channel conditions. The feedback data can include one or more of a precoding matrix index, a channel quality indicator, and a rank index. The terminal device can transmit the feedback data to the remote antenna unit. The remote antenna unit can transmit the feedback data to the base station 101 via the DAS 100. The base station 101 can select a precoding matrix based on the feedback data. The terminal device can provide this information to a base station 101. The base station 101 can modify the precoding codebook selection to improve overall system performance.

In some aspects, a terminal device located in a given segment may request that base station 101 transmit downlink signals using codebook index 0. The base station 101 can accept or reject the terminal device's codebook index request. The base station 101 may reject the request because, for example, the base station 101 may determine that the terminal device has performed a false measurement and incorrectly reported the precoding matrix identifier associated with a different segment in the DAS 100. In other aspects, the terminal device may provide measurements of the channel conditions without a codebook request to the base station 101. The base station 101 can select a codebook index decide based on the measurements provided by the terminal device.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A system comprising:
    remote antenna units of a distributed antenna system;
    a combiner unit of the distributed antenna system, the combiner unit communicatively connectable to a base station and communicatively connectable to the remote antenna units, wherein the combiner unit is configured to:
        receive at least two uplink signals from the remote antenna units, wherein remote antenna units receive the at least two uplink signals from one or more wireless terminal devices, and
        combine the at least two uplink signals into at least one combined uplink signal and send the at least one combined uplink signal to the base station,
        wherein a first remote antenna unit and a second remote antenna unit receive a first uplink signal associated with a first uplink data stream and a second uplink signal associated with a second uplink data stream, respectively;
        wherein a third remote antenna unit and a fourth remote antenna unit receive a third uplink signal associated with a third uplink data stream and a fourth uplink signal associated with a fourth uplink data stream, respectively;
        wherein the combiner unit is configured to combine the first uplink data stream with the third uplink data stream to form a first combined uplink signal; and
        wherein the first combined uplink signal is transmitted to a first uplink port of the base station.

2. The system of claim 1, wherein the remote antenna units are organized into at least a first segment and a second segment;
    wherein the first segment comprises at least the first remote antenna unit and the second remote antenna unit;
    wherein the second segment comprises at least the third remote antenna unit and the fourth remote antenna unit; and
    wherein the first segment is adjacent to the second segment.

3. The system of claim 2, wherein the combiner unit is configured to combine the first uplink data stream, received at the first remote antenna unit in the first segment, with the third uplink data stream, received at the third remote antenna unit in the second segment, to form the first combined uplink signal.

4. The system of claim 3, wherein the combiner unit is configured to combine the second uplink data stream, received at the second remote antenna unit in the first segment, with the fourth uplink data stream, received at the fourth remote antenna unit in the second segment, to form a second combined uplink signal.

5. The system of claim 1, wherein the combiner unit is configured to combine the second uplink data stream with the fourth uplink data stream to form a second combined uplink signal;
    wherein the second combined uplink signal is transmitted to a second uplink port of the base station.

6. The system of claim 5, wherein the first uplink port of the base station is associated with a first antenna polarization, wherein the second uplink port of the base station is associated with a second antenna polarization.

7. The system of claim 1, wherein a number of uplink signals is greater than a number of antenna ports at the base station.

8. The system of claim 1, wherein the at least two uplink signals comprise one or more single-user multiple-input/multiple-output (SU-MIMO) uplink signals, one or more multi-user multiple-input/multiple-output (MU-MIMO) uplink signals, or a combination of both.

9. A method in a distributed antenna system comprising remote antenna units and a combiner unit that is communicatively connectable to a base station and the remote antenna units, wherein the method comprises:
    receiving at least two uplink signals from the remote antenna units, wherein remote antenna units receive the at least two uplink signals from one or more wireless terminal devices, and
    combining the at least two uplink signals into at least one combined uplink signal and sending the at least one combined uplink signal to the base station,
    wherein a first remote antenna unit and a second remote antenna unit receive a first uplink signal associated with a first uplink data stream and a second uplink signal associated with a second uplink data stream, respectively;
    wherein a third remote antenna unit and a fourth remote antenna unit receive a third uplink signal associated with a third uplink data stream and a fourth uplink signal associated with a fourth uplink data stream, respectively;

wherein the combining comprises combining the first uplink data stream with the third uplink data stream to form a first combined uplink signal; and wherein the method further comprises transmitting the first combined uplink signal to a first uplink port of the base station.

10. The method of claim 9, wherein the remote antenna units are organized into at least a first segment and a second segment;

wherein the first segment comprises at least the first remote antenna unit and the second remote antenna unit;

wherein the second segment comprises at least the third remote antenna unit and the fourth remote antenna unit; and wherein the first segment is adjacent to the second segment.

11. The method of claim 10, wherein the combining comprises combining the first uplink data stream, received at the first remote antenna unit in the first segment, with the third uplink data stream, received at the third remote antenna unit in the second segment, to form the first combined uplink signal.

12. The method of claim 11, wherein the combining comprises combining the second uplink data stream, received at the second remote antenna unit in the first segment, with the fourth uplink data stream, received at the fourth remote antenna unit in the second segment, to form a second combined uplink signal.

13. The method of claim 9, wherein the combining comprises combining the second uplink data stream with the fourth uplink data stream to form a second combined uplink signal;

wherein the method further comprises transmitting the second combined uplink signal to a second uplink port of the base station.

14. The method of claim 13, wherein the first uplink port of the base station is associated with a first antenna polarization, wherein the second uplink port of the base station is associated with a second antenna polarization.

15. The method of claim 9, wherein a number of uplink signals is greater than a number of antenna ports at the base station.

16. The method of claim 9, wherein the at least two uplink signals comprise one or more single-user multiple-input/multiple-output (SU-MIMO) uplink signals, one or more multi-user multiple-input/multiple-output (MU-MIMO) uplink signals, or a combination of both.

* * * * *